W. H. TAYLOR.
BROACH FOR MAKING KEY SLOTS.
No. 267,808. Patented Nov. 21, 1882.
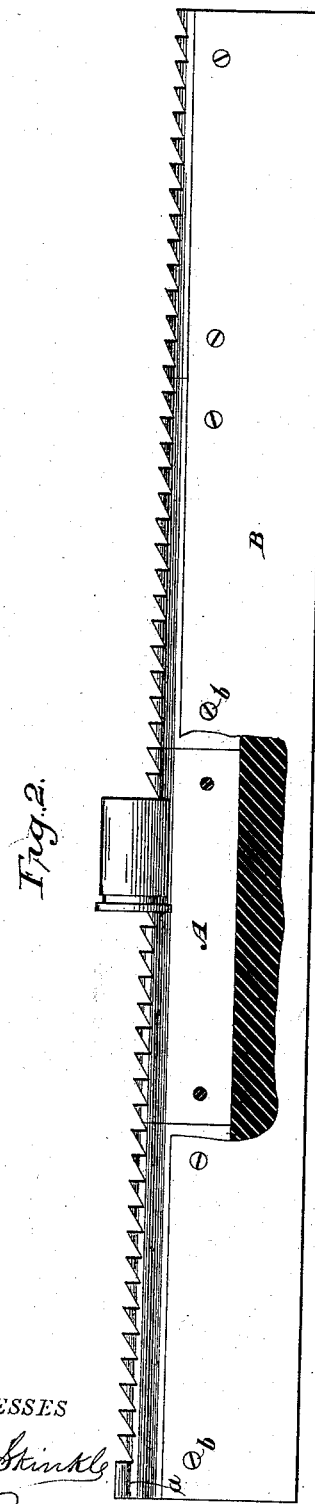
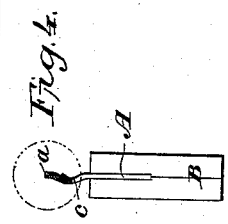
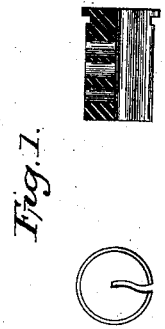
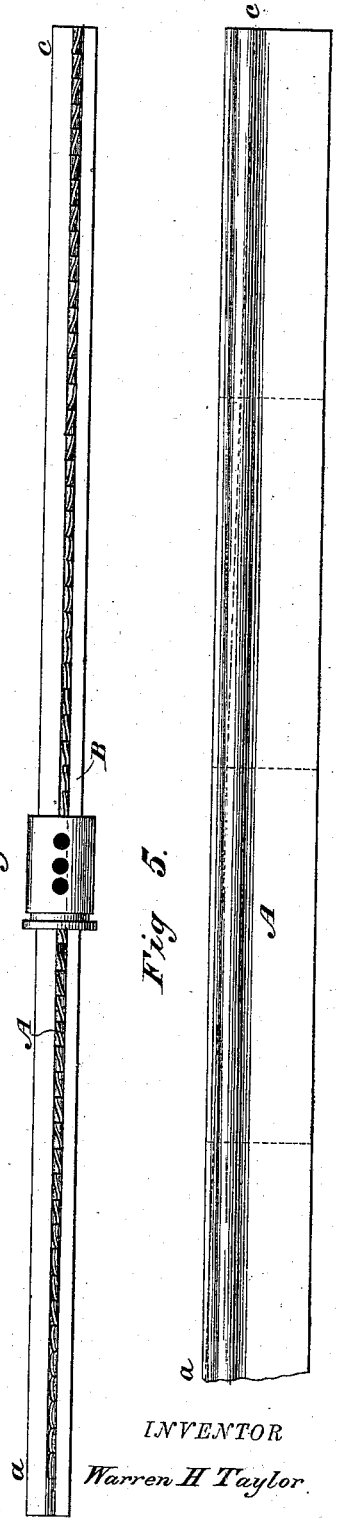
WITNESSES
INVENTOR
Warren H Taylor
By his Attorneys
Baldwin, Hopkins, & Peyton.

UNITED STATES PATENT OFFICE.

WARREN H. TAYLOR, OF STAMFORD, CONNECTICUT, ASSIGNOR TO THE YALE LOCK MANUFACTURING COMPANY, OF SAME PLACE.

BROACH FOR MAKING KEY-SLOTS.

SPECIFICATION forming part of Letters Patent No. 267,808, dated November 21, 1882.

Application filed April 1, 1878.

*To all whom it may concern:*

Be it known that I, WARREN H. TAYLOR, of Stamford, in the county of Fairfield and State of Connecticut, have invented a novel Tool for Forming Key-Slots, of which the following is a specification.

There are many well-known advantages in the use of sheet-metal keys of cyma-recta and cyma-reversa outline on the opposite sides of their blades, which are of equal thickness at all points, and it is desirable to be able to rapidly and economically form correspondingly-shaped longitudinal key-slots in the hubs or cylinders of pin or tumbler locks—such, for instance, as that patented to Linus Yale, Jr., June 27, 1865—which employ sheet-metal keys, and my invention is intended to accomplish this object.

It consists in a peculiar tool or implement, that I term a "broach," to be employed for forming such sinuous slots.

In the accompanying drawings illustrating my invention, Figure 1 is an end elevation of a slotted key-hub and the same in longitudinal cross-section. Fig. 2 is a side elevation, partly in section, showing the broach with a key-hub mounted upon it midway and partly slotted. Fig. 3 is a plan view of the broach with a partly-slotted key-hub in a like situation. Fig. 4 is an end elevation of the broach and slotted hub, and Fig. 5 is a view illustrating a mode of manufacturing the broach.

A indicates the blade or cutter of properly-hardened steel, which is composed of serrated or toothed sections, as illustrated in Fig. 2, and which constitutes my broach proper. This cutter is firmly but detachably secured in any suitable manner in a metal support or holder, B, and this holder may be formed of a single grooved bar, or of two shouldered plates clamped together by screws $b$, which pass through and serve to secure the different sections of the cutter. By inspection of the drawings it will be noted that the serrated cutting-edge of the blade presents an inclined plane relative to the upper surface of the holder, and that at its end $a$ of greatest elevation above the holder its sides exhibit respectively cyma-recta and cyma-reversa contours. It will be noted, also, that the serrations or teeth at the end $c$ of least elevation above the holder incline to one side in a curved line. As they are followed along toward the middle of the broach they incline less and less until a point is reached at which the cutting-edge of one of them is perpendicular, and then they begin to incline gradually to the opposite side in a similar curved line. Approaching the end of greatest elevation they incline less and less, and finally again a point is reached at which the cutting-edge of one of them is perpendicular, and then they begin to incline gradually to the same side as at the beginning until the extreme end of greatest elevation above the holder is reached. Again, it will be noted that each tooth, whether inclined to one side or the other, or standing with its cutting-edge perpendicular, is more or less bent in a curved or double-curved line. Now, the inclination of the plane of the cutting-edge, the deviation of the teeth gradually from one side to the other as they are traced along, and the curvature of each separate tooth are the essential conditions of successful operation of my broach, and I will proceed to describe how I secure these conditions in the process of manufacture. In the first place I take a steel plate of sufficient length and width for a broach, and, by stamping and crimping or corrugating with dies or otherwise, give to one side or half of it the necessary cyma-recta and cyma-reversa contours, as shown in Fig. 5. I then cut away a portion of the stamped part, as indicated by the dotted line, Fig. 5, to obtain the inclined cutting-face, and afterward form the teeth or serrations in the usual way. I next cut the blade thus formed into sections and harden them. By thus forming the broach in sections any injury to one section in the process of hardening or in operating the finished tool involves only the loss of that section, which can be replaced by another.

By this process of manufacture all of the sections formed from different blanks can be made and numbered to correspond, and all of the complete broaches of a given pattern will be uniform in size and shape, and when used will make exactly similar sinuous slots.

Although the particular use to which I propose to apply my invention is to form sinuous slots in key-hubs, it is of course not limited in its usefulness to that object, but may be employed wherever it is desirable to form sinuous slots of equal width in wood or metal.

My broach is intended to be used in the ordinary manner, either by hand or in a power machine. The back or holder may slide in a suitable guideway, and the key-hub or other work may be held in any suitable work-holder or vise rigidly in the proper relation to the broach. Either may be caused to move against the other, when the broach-teeth at the end of least elevation from the holder will impinge against the side of the work, and as advance is made will gradually cut deeper and deeper into it, thus forming a slot or kerf having the desired sinuous contour.

It will be observed that the work and broach will interlock in the process of cutting, and can only be separated by withdrawal of one or the other endwise.

I have specified the formation of a sinuous slot of cyma-recta and cyma-reversa contour; but of course any other form of sinuous slot might be made by the use of a tool of other conformation without departing from my invention. I have also specified the method of manufacturing my broach that I prefer to adopt; but it is obvious that other methods might be adopted. For instance, the sections might be crimped and toothed separately.

What I claim as new and of my invention is—

1. A broach formed of corrugated sections secured to a holder, and having an inclined cutting-edge, substantially as described.

2. A straight broach having its sides longitudinally corrugated, and having an inclined edge and curved and deviating teeth, substantially as described.

In testimony whereof I have hereunto subscribed my name.

WARREN H. TAYLOR.

Witnesses:
E. D. OGDEN, Jr.,
SCHUYLER MERRITT.